United States Patent [19]

Ingraham

[11] Patent Number: 5,789,915
[45] Date of Patent: Aug. 4, 1998

[54] MAGNETIC FIELD ENERGY RESPONSIVE POSITION SENSING APPARATUS AND METHOD

[75] Inventor: Ronald D. Ingraham, Reed City, Mich.

[73] Assignee: Nartron Corporation, Reed City, Mich.

[21] Appl. No.: 166,375

[22] Filed: Dec. 10, 1993

Related U.S. Application Data

[60] Continuation of Ser. No. 798,649, Nov. 26, 1991, abandoned, which is a division of Ser. No. 534,353, Jun. 7, 1990, abandoned, which is a continuation of Ser. No. 131,626, Feb. 17, 1989, abandoned.

[51] Int. Cl.⁶ .............. G01B 7/14; G01N 27/72; G01R 33/00
[52] U.S. Cl. .............. 324/207.2; 324/207.26; 324/235
[58] Field of Search .............. 324/207.2, 207.25, 324/235, 251, 207.24, 207.26, 207.22; 338/32 R, 32 H

[56] References Cited

U.S. PATENT DOCUMENTS

| | | | |
|---|---|---|---|
| 3,042,854 | 7/1962 | Maaz | 324/251 |
| 3,291,918 | 12/1966 | Kuhrt | 324/251 |
| 3,317,829 | 5/1967 | Kuhrt et al. | 324/207.2 |
| 3,596,114 | 7/1971 | Maupin et al. | 324/235 |
| 4,107,604 | 8/1978 | Bernier | 324/207.2 |
| 4,141,026 | 2/1979 | Bate et al. | 357/27 |
| 4,268,814 | 5/1981 | Henrion et al. | 338/32 H |
| 4,361,835 | 11/1982 | Naty | 324/207.2 |
| 4,532,810 | 8/1985 | Prinz et al. | 324/207.24 |
| 4,855,675 | 8/1989 | Russell et al. | 324/207.24 |

FOREIGN PATENT DOCUMENTS

| | | | |
|---|---|---|---|
| 227116 | 11/1985 | Japan | 324/207.2 |
| 96511 | 4/1989 | Japan | 324/207.24 |
| 377696 | 6/1973 | U.S.S.R. | 324/251 |

*Primary Examiner*—Walter E. Snow
*Attorney, Agent, or Firm*—Watts, Hoffman, Fisher & Heinke Co., L.P.A.

[57] ABSTRACT

The invention concerns magnetic field energy responsive position sensing apparatus and method. A Hall sensor has an element defining a generally planar active face and circuitry coupled to said Hall sensor for producing a two state electrical output signal in response to magnetic field energy in a region of said active face. A ring magnet has spaced apart annular end walls that are adjacent a north pole and south pole of the ring magnet and defines a magnetic field in a center region of the ring magnet. The ring magnet and the Hall sensor are mounted for relative linear movement in a direction substantially normal to the active face of the Hall sensor so that the active face moves through the center region of the ring magnet. One annular end wall of the ring magnet moves past the active face while avoiding mechanical contact with the active face. This causes the electrical output signal to change state as the end wall moves past the active face of the Hall sensor element. A latch circuitry is coupled to the Hall sensor for maintaining a signal output from said sensor subsequent to initiation of the output signal.

3 Claims, 4 Drawing Sheets

MAGNETIC FIELD ENERGY RESPONSIVE POSITION SENSING APPARATUS AND METHOD

This is a continuation of application Ser. No. 07/798,649 filed Nov. 26, 1991, now abandoned, which was a division of application Ser. No. 07/534,353 filed Jun. 7, 1990, now abandoned, which is a continuation of application Ser. No. 07/131,626 filed Feb. 17, 1989, now abandoned.

TECHNICAL FIELD

The present invention relates to method and apparatus for cyclically activating a hydraulic pump used with a power steering system.

BACKGROUND ART

One example of a prior art power steering device for use with an outboard motor utilizes compressed nitrogen gas to apply steering torque to the boat rudder. An hydraulic pump that is activated by an electric motor maintains pressure in the nitrogen gas. The system includes an accumulator wherein nitrogen gas under pressure is maintained during boat operation. As the boat is operated and the operator uses the steering system, the gas pressure in the accumulator diminishes and a movable piston mounted within the power steering system responds to this reduced pressure by moving within the unit. This movement has in the prior art been sensed by a contact sensing switch which periodically activates the electric hydraulic pump to re-charge the pressure.

The use of a physical contact for monitoring movement of the piston shortens the useful life of the system due to wear and erosion of the mechanical contact. This is especially true due to the repetitive nature of the piston movement back and forth against the switching contact.

DISCLOSURE OF THE INVENTION

The present invention concerns a mechanism for increasing the life of a sensor used in cyclically activating a power steering hydraulic pump. A system constructed in accordance with the invention has a sensor for sensing movement of a pressure sensitive element within the power steering unit. The sensor provides a signal output which activates a pressure source that recharges the power steering unit. A latch and drive circuit coupled to the signal output from the sensor activates the pressure source and thereby increases the pressure within a pressure accumulator until the sensor output changes state, indicating a movement of the pressure sensitive element in response to pressure source activation.

A timing circuit coupled to an output from the latch monitors the amount of time the pressure source is activated. This circuit automatically de-activates the pressure source in the event a longer than adequate time period has elapsed since the pressure source is activated.

An additional feature of the invention is the technique used to sense pressure variation in the accumulator. A Hall sensor has an active face that is mounted perpendicular to the path of travel of a magnet that moves within the accumulator as the pressure changes. The flux of the magnet only triggers the Hall device as it reaches a point near the Hall sensor active face. The triggering is very accurate and not significantly dependant on the gap or spacing between the Hall sensor and the magnet.

In accordance with the preferred design the pressure source is an electric motor for a power steering pump. The motor is activated and de-activated in response to Hall sensor output and in particular, the Hall sensor is utilized to monitor the movement of a piston whose position within the power steering unit depends on accumulator pressure. If the pressure within the accumulator drops to a specified value the piston moves to a certain position. The Hall sensor output triggers motor activation which increases the pressure within the accumulator. If this does not happen within a time period controlled by the timing circuit, the motor is de-activated.

The preferred system is for use in a outboard motor. In the event of a failure by the power steering pump to repressurize the accumulator in response to Hall sensor output, the user must toggle the ignition switch on and off to reset the system. If this does not produce a favorable result, i.e., the pressure within the power steering accumulator is not increased, the timing circuit will again de-activate the power steering unit.

One object of the invention is a power steering control having a non-contact sensor for monitoring the position of a movable piston within the power steering unit. This and other objects, advantages and features of the invention will become better understood from a detailed description of the preferred embodiment of the invention which is described in conjunction with the accompanying drawings.

BEST MODE FOR CARRYING OUT THE INVENTION

Figure 1:
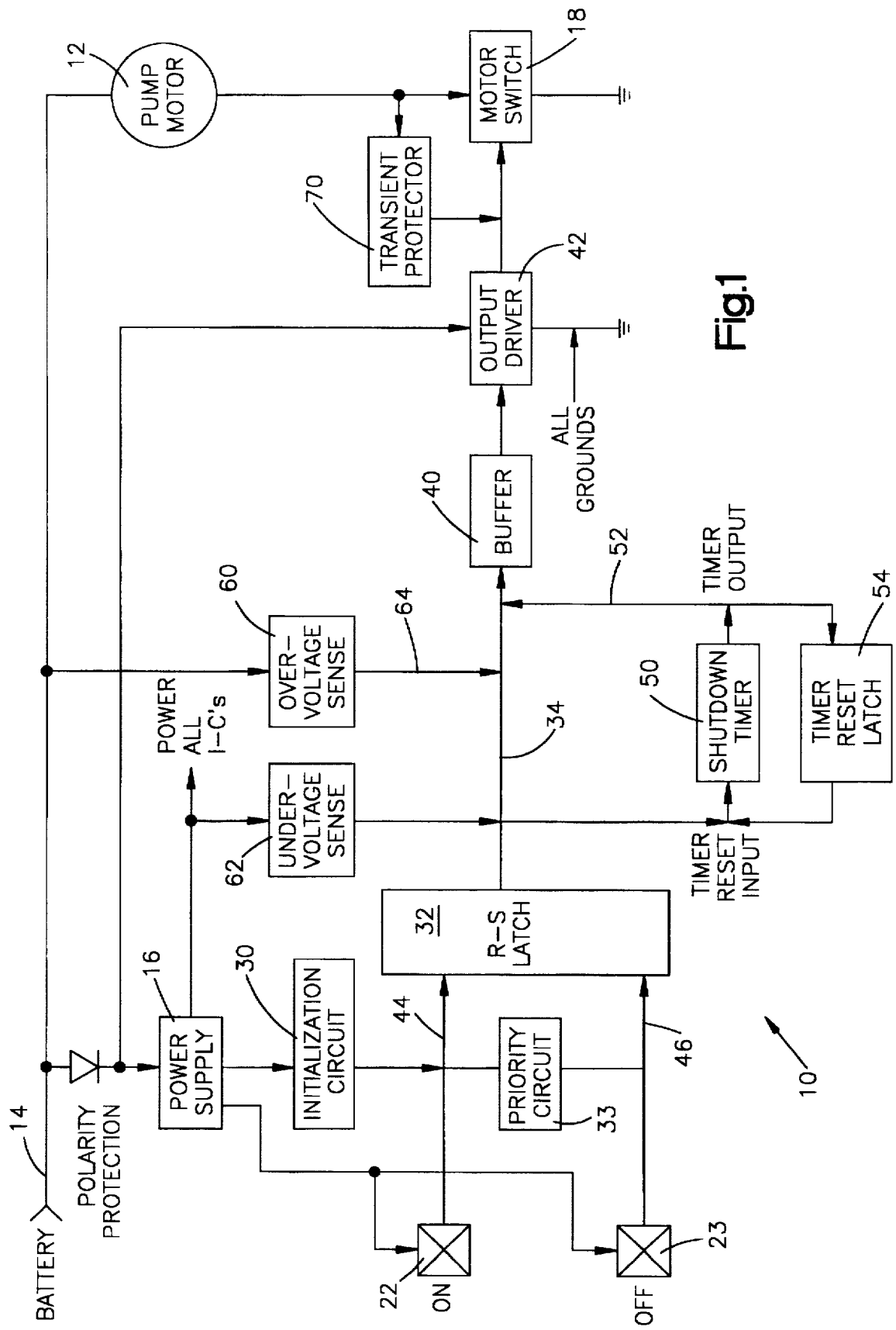
FIG. 1 is a block diagram of an hydraulic pump activation circuit for use with a power steering unit.

Turning now to the drawings, FIG. 1 is a schematic of a power steering control circuit 10 for cyclically activating a power steering pump motor 12 in response to a sensed pressure condition indicated by a position of a movable pressure responsive component within a power steering unit. The particular use of the invention is for a power steering unit used with an outboard motor but the invention has applicability to any power steering unit having a hydraulic pump for recharging the steering unit.

The boat, operator activates the system by closing the ignition switch, which through a solenoid (not shown) applies battery voltage to the control circuit 10. A battery input 14 couples a voltage in a range of 12 volts to a power supply 16 which provides a conditioned direct current signal for the remaining components of the circuit 10. The battery voltage is also coupled to the pump motor 12 which through selective activation of a motor switch 18 energizes the motor and repressurizes a power steering accumulator wherein fluid, preferably nitrogen gas, is maintained. Two Hall sensors (FIG. 3) 22, 23 are mounted within a cylindrical accumulator 24 (FIG. 4) which supports a piston 25. The sensors 22, 23 monitor movement of the piston 25 in response to pressure changes within the accumulator 24.

The two Hall sensors 22, 23 are spaced apart a distance of approximately 0.8 of an inch and monitor movement of a permanent magnet 26 mounted to the piston as the piston moves back and forth in response to pump pressurization of the power steering fluid accumulator. When the permanent magnet 26 reaches the Hall sensor 22, it is an indication that the pressure within the accumulator needs recharging and an output signal from the Hall sensor 22 is used to activate the pump motor 12. When the magnet 26 reaches the second Hall sensor 23, it is an indication that the accumulator has been recharged and the pump motor 12 can be de-energized.

The operation of Hall effect sensors is documented in the literature and reference is made for example to a Hall effect booklet published by the Micro Switch Division of Honeywell.

Upon power up of the circuit 10, the magnet 26 will typically be in a position midway between the Hall sensors 22, 23. The accumulator is neither fully charged nor fully depleted. In this circumstance, an initialization circuit 30 is designed to activate the pump motor 12 to fully recharge the accumulator.

Inputs from the initialization circuit 30 and two Hall sensors 22, 23 are coupled to a R-S latch circuit 32 having an output 34 that controllably energizes the motor by activation of the motor switch 18. The output 34 is coupled to a buffer circuit 40 and drive circuit 42 which are depicted in greater detail in FIG. 2. Receipt of an on (approximately +12 volts) signal at an input 44 to the latch 32 from the Hall effect sensor 22 causes the driver circuit 42 to activate the switch 18, energizing the motor 12 by applying battery voltage across the motor 12. This recharges the accumulator 24. The piston 25 moves as pressure in the accumulator increases and during normal operation causes the magnet 26 to move in juxtaposition to the Hall sensor 23. The sensor 23 generates an output 46 to the latch circuit 32 indicating the motor switch 18 should be de-activated.

A timing circuit 50 coupled to the output 34 from the latch 32 monitors performance of the system and in the event the magnet 26 never reaches the position of the Hall sensor 23 the timing circuit 50 de-energizes the motor 12. The timing circuit 50 initiates the timing function upon receipt of a signal from the latch 32 indicating the motor 12 has been energized. After a delay period designed to allow the motor to repressurize the accumulator, (in a preferred design up to 120 seconds) an output 52 is generated de-energizing the motor.

The output 52 also activates a latch 54 which inhibits resetting of the timer 50. So long as the timer is not reset, the motor 12 is de-activated. To restart, the operator must toggle the ignition switch off and then back on. This resets the timer 50. In the event motor energization still fails to produce the appropriate pressure within the accumulator as sensed by the Hall device 23, the motor 12 will again be de-activated.

As seen in the block diagram of FIG. 1, the circuit 10 includes an over voltage protection circuit 60 as well as an under voltage protection circuit 62. In the event of a high battery output voltage 14 caused by jump starting, battery or wiring defects, the circuit 60 provides an inhibit signal 64 which de-activates motor energization. In the event of failure of the alternator or excessive battery load, the under voltage sensing circuit 62 shuts down the system until the voltage from the battery is within a proper range. In the preferred range, the circuit 10 is operative so long as the battery voltage is within a range of from 10.5 to 17 volts.

The circuit 10 includes a transient protector circuit 70 which limits spike voltages by clamping the voltage to a safe level. Such voltage spikes are fast acting so that the over voltage protection circuit 60 cannot respond to such spikes in time to open the motor switch 18.

Figure 2A:
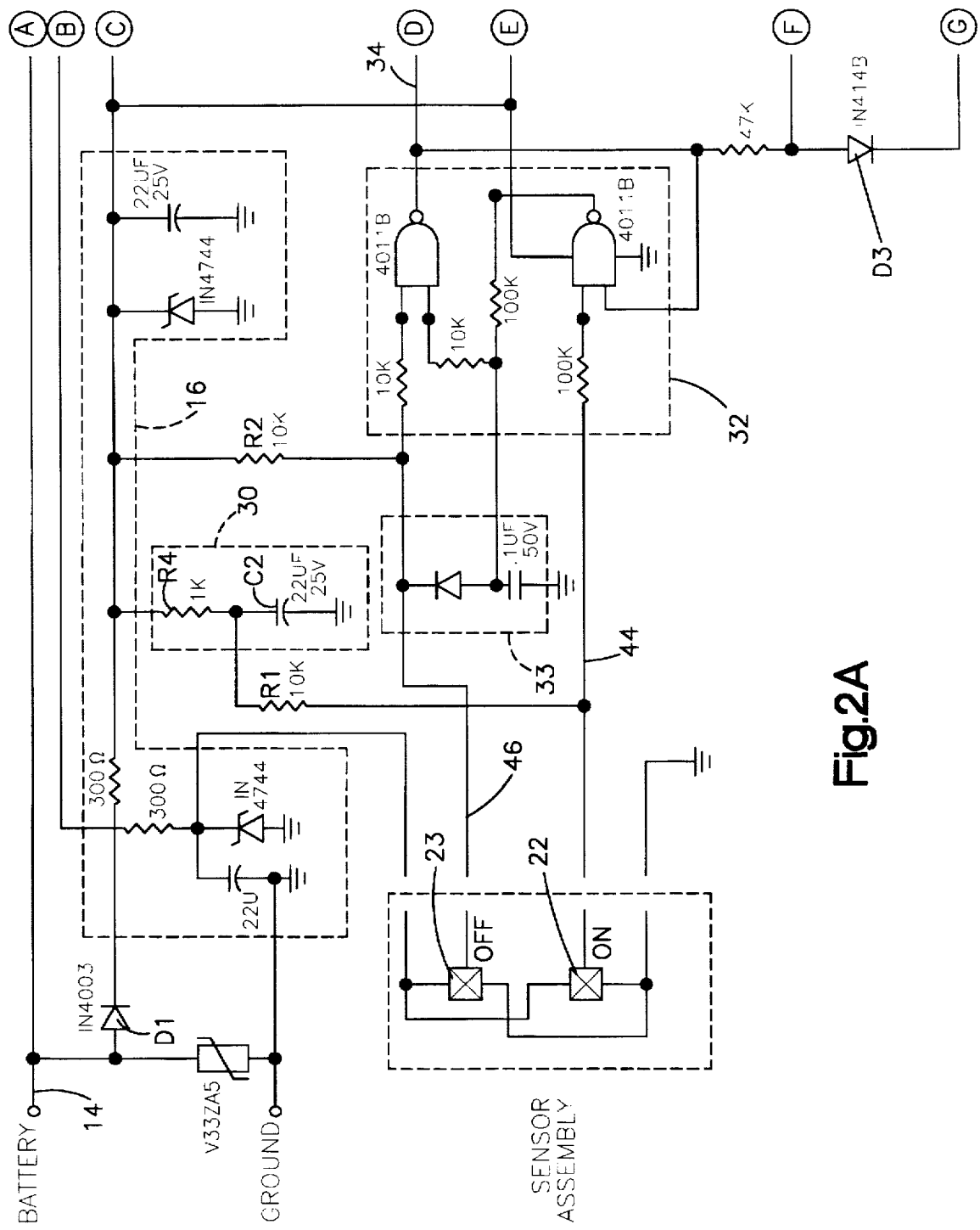
FIGS. 2A and 2B are more detailed schematics showing specific circuit components for the pump activation circuit.
Figure 2B:
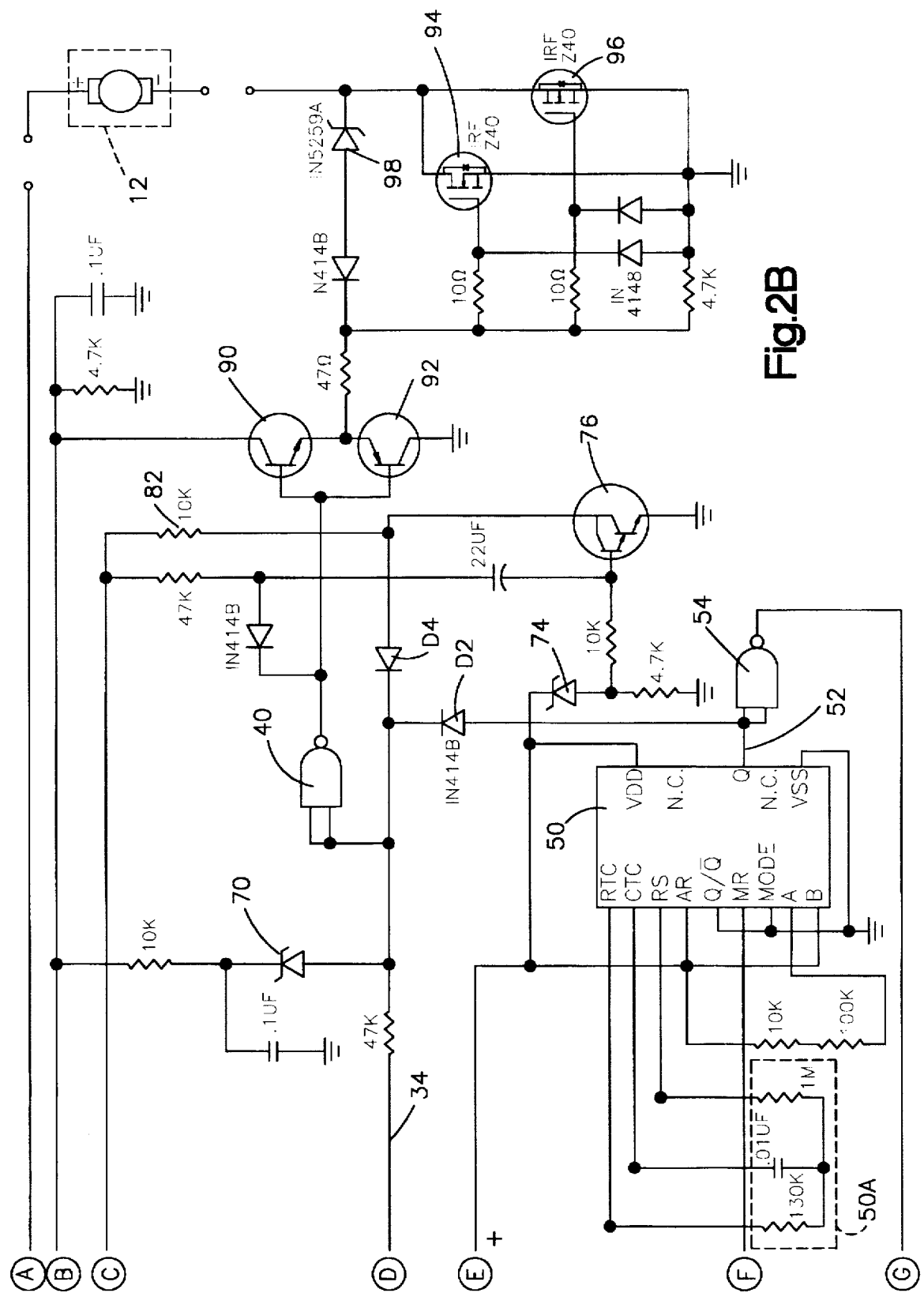

Turning now to FIG. 2a and 2b, the schematic block diagram of FIG. 1 is shown in more detail to show interconnection between circuit elements. The battery input 14 passes through a diode D1 which provides a reverse polarity protection. The motor 12 is not harmed by a reverse polarity input at the battery 14 but other circuit components in the circuitry 10 would be damaged but for the presence of this diode. A zener diode Z1 and capacitor C1 receive the battery input and provide a regulated voltage output for the rest of the circuit 10.

Two resistors R1, R2 form pull-up resistors for the latch circuit 32. The initialization circuit 30 is formed by the combination of a resistor R4 and capacitor C2. When battery voltage is first applied to the system, the piston 25 is typically intermediate the two extreme positions wherein the Hall sensors are designed to activate and de-activate motor operation. The voltage at the junction between the resistor R4 and capacitor C2 rises from a low value with a time constant dependent upon the component values of this combination. This assures that an input 46 to the latch 32 remains low for a predetermined turn-on time. This assures that the motor 12 is activated at turn-on. If, however, the output from the sensor 23 at the output 46 is already low, indicating the piston is already positioned at a point indicating the accumulator is fully pressurized, a priority circuit 33 overrides the effect a low signal from the circuit 30 has at the input 44 and assures the motor 12 remains de-energized.

The timer 50 utilizes a Signetics Model No. 4541B integrated circuit having a reset input MR coupled to the output 34 from the latch circuit 32. Upon receipt of a low signal at this reset input the timer begins to count at a frequency dependent upon an oscillator circuit 50a coupled to the timer 50. When the timer reaches a time-out count, an output 52 goes high and is coupled by a diode D2 to the latch output 34. This shuts off the motor 12. At the same time this high signal is coupled to the output 34, an invertor circuit 54 couples a low input signal back to the reset input to the timer 50 through a diode D3. This signal remains low even if the output 34 from the latch 32 goes high indicating the motor operation should be terminated. To reset the timer 50 once it times out requires the toggling off and on of the ignitions The over-voltage protection circuit 60 is formed by a resistor and series coupled zener diode 70 connected to the output 34 from the latch circuit 32. In the event the battery voltage rises to a sufficiently high value to cause the zener diode 70 to conduct, the output 34 from the latch 32 is pulled high and the motor 12 is deactivated. The low-voltage sensing circuit 62 is formed from the combination of a zener diode 74 and transistor 76. So long as the zener diode 74 conducts, the output from the transistor 76 is low and a diode D4 coupled to the output 34 remains reverse biased. If the transistor 76 turns off, a resistor 82 pulls the voltage on the diode D4 up to a level which causes the diode to conduct and pull the output 34 high turning off the motor.

The combination of two transistors 90, 92 coupled to the output from the buffer amplifier 40 constitute the driver circuit 42. These transistors 90, 92 form a "totem-pole" driver for activating the two FET switching transistors 94, 96 of the motor switch 18. The driver 42 supplies a low-impedance source/sink switching signal to charge/discharge the gate capacity of the FET switching transistors 94, 96. Fast switching minimizes high power pulses occurring during the switching times.

Transient voltage protection for the circuit 10 is afforded by the FET internal diode for negative transient protection and by a zener diode 98 which turns on the FET for the period of the transient during positive spikes. The zener breakdown voltage is selected to be higher than the rated battery output voltage but lower than the FET breakdown voltage.

Figure 4:
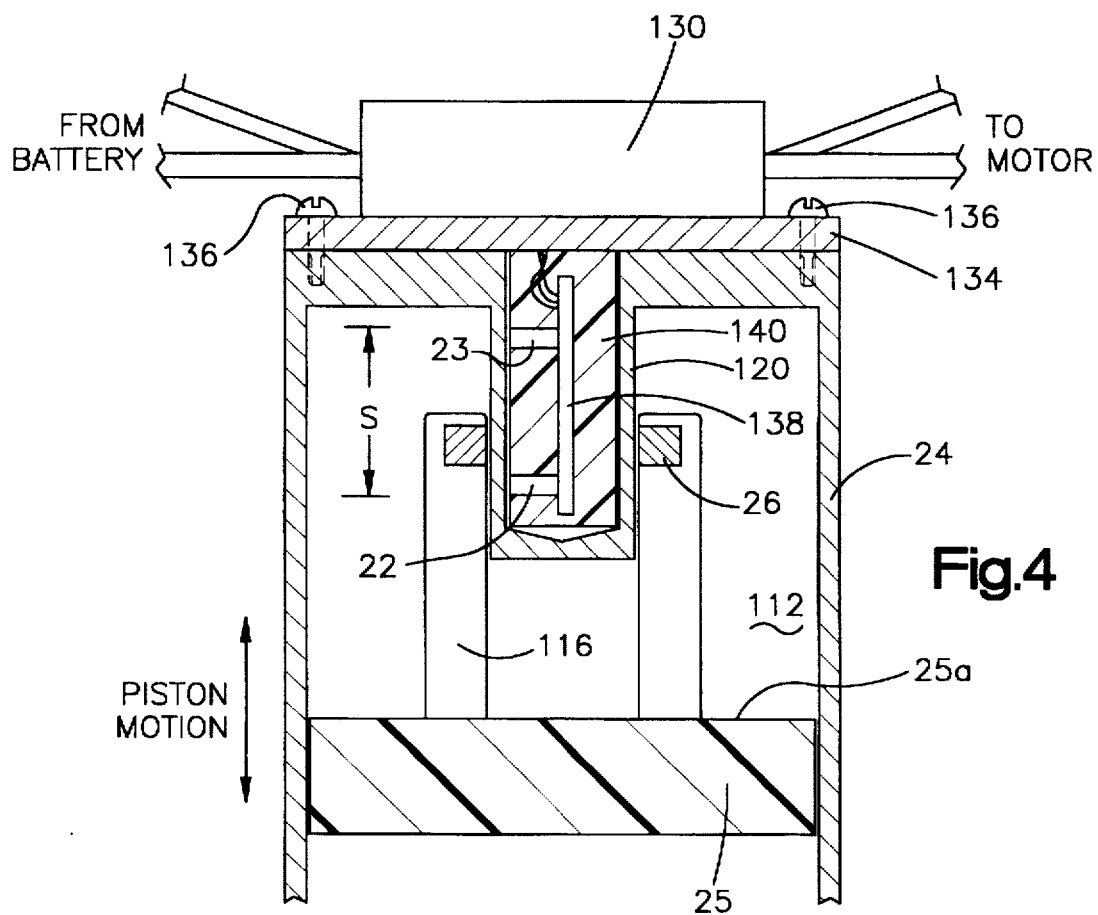
FIG. 4 is a section view showing a mounting configuration of two Hall sensors used to monitor pressure variations within the power steering unit.

Turning now to FIG. 4, the arrangement of the sensing electronics with respect to the power steering accumulator 24 is depicted. The accumulator 24 defines a cylindrical chamber 112 having pressurized nitrogen gas contained within the confines of the chamber. This pressurized gas is used to pressurize the power steering unit.

The piston 25 is mounted within the accumulator 24 for back and forth movement depending upon the pressure of gas inside the chamber 112. As the pressure of the hydraulic power steering fluid within the chamber 112 increases, the piston tends to apply a greater force against the nitrogen gas in contact with a piston surface 25a. In use, the gas pressure decreases and as this occurs the piston 25 moves within the accumulator 24 causing a cylindrical piston extension 116 that carries the magnet 26 to move in relation to the two Hall sensors 22, 23 coupled to the accumulator 24. One end of the accumulator 24 defines a cylindrical well 120 which extends into the cavity or chamber 112 a sufficient distance to allow the two Hall sensors 22, 23 to be inserted into the accumulator for monitoring movement of the magnet 26. The accumulator and particularly the portion of the accumulator which defines the well 120 is constructed from aluminum which does not disrupt the magnetic field created by the ring magnet 26.

An electronics module 130 that encloses the circuit 10 is fixed to one side of a rigid support 134, affixed to the accumulator by threaded connectors 136. The sensors 22, 23 are connected to an opposite side of the rigid support 134. During fabrication of this unit, the Hall sensors 22, 23 are mounted to a printed circuit board 138 at a spacing S. In a preferred embodiment of the invention the spacing S is approximately 0.8 inches.

A solid PVC (polyvinylchloride) tube 140 is molded around the sensors 22, 23 after signal carrying conductors in the form of a ribbon cable routed from the circuit 10 are coupled to the sensors 22, 23. As the magnet 26 moves back and forth within the accumulator cavity 112 appropriate signals are generated via the Hall sensors 22, 24 and transmitted to the electronics module 130 for activating and deactivating the motor. As seen in FIG. 4, a ground connection and battery input are coupled to one side of the electronics module 130 and two motor energization leads are coupled to an output portion of the module 130.

Figure 3:
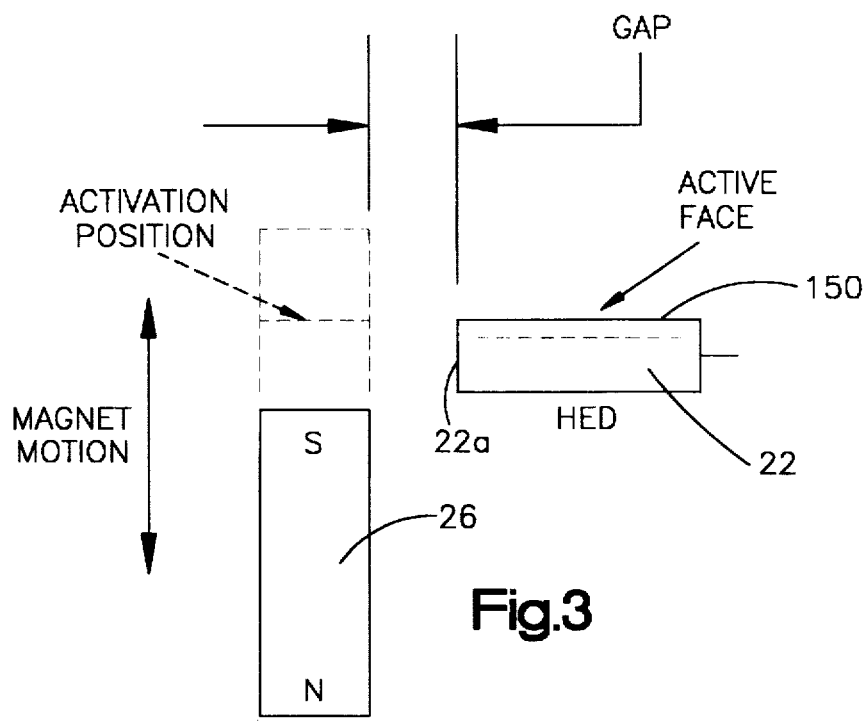
FIG. 3 is a side view depiction showing a Hall sensor mounted within a power steering unit for monitoring movement of a pressure sensitive piston.

A new technique is utilized for monitoring the position of the ring magnet 26 with respect to the two Hall sensors 22, 23. As seen in FIG. 3, the Hall sensors are mounted so that an active face 150 of the Hall sensor 22, for example, is perpendicular to the movement of the ring magnet 26. In the FIG. 3 depiction, a south pole of the ring magnet 26 is presented to a back side, away from the active face 150 of the Hall effect device 22. As the magnet moves past the plane of the Hall element within the effect sensor, the south pole lines of force penetrate the active face and activate a Hall effect output signal. The gap between the Hall effect device and magnet is maintained uniform as the magnet moves back and forth past the Hall sensors 22, 23. This gap spacing is not critical and gaps in the range of ¼ inch between the Hall effect device and the ring magnet have been used with success. In a preferred design this gap spacing is approximately 0.150 inch. To minimize this gap spacing the polyvinylchloride tube 140 is molded around the sensor support and sensors so that an edge 22a (for example) of the Hall effect sensor extends beyond the boundary of the tube 140 and butts an innerwall of the accumulator well 120.

The present invention has been described with a degree of particularity. It is the intent, however, that the invention include all modifications and alterations from the disclosed design falling within the spirit or scope of the appended claims.

I claim:

1. Magnetic field energy responsive position sensing apparatus comprising:

a) a Hall sensor having an element defining a generally planar active face and circuitry coupled to said Hall sensor for producing a two state electrical output signal in response to magnetic field energy in a region of said active face;

b) a ring magnet having spaced apart annular end walls adjacent a north pole and south sole of said ring magnet wherein said ring magnet defines a magnetic field in a center region of the ring magnet;

c) structure for mounting said ring magnet and said Hall sensor for relative substantially linear movement in a direction substantially normal to the active face of the Hall sensor element to move said active face through the center region of the ring magnet, the magnet moving along a path of travel such that one annular end wall of the magnet moves past said active face while avoiding mechanically contacting said active face and causes the electrical output signal to change state as the one end wall of the ring magnet moves past the active face of the Hall sensor element; and d) latch circuitry coupled to the Hall sensor for maintaining said signal output from said sensor subsequent to initiation of said output signal.

2. The apparatus of claim 1, wherein:

said configuration of said magnet provides for a gap of approximately 0.25 inches between said ring magnet and said active face as said ring magnet passes by a point of closest approach to said active face of the Hall sensor.

3. A method for monitoring a relative position of two relatively moveable parts, said method comprising the steps of:

a) mounting a Hall sensor, having a generally planar magnetic field responsive active face, to one of said parts;

b) mounting a ring magnet having spaced apart opposite polarized annular end walls defining a magnetic field for sensing movement of the Hall sensor along a path of travel generally normal to a plane defined by said active face when in close proximity to said Hall sensor, said path being translationally displaced from said active face such that one annular end wall of said magnet can move past the active face while avoiding mechanically contacting said face; and c) monitoring a change in an output state of said Hall sensor as said magnet moves relatively along said path of travel, the output state of the Hall sensor changing when one of the two end walls of the magnet passes the active face.

* * * * *